United States Patent
Cardinal (10) Patent No.: US 9,858,558 B1
(45) Date of Patent: Jan. 2, 2018

(54) MULTI-SCREEN AUTOMATED TELLER MACHINE (ATM)/AUTOMATED TELLER ASSIST (ATA) MACHINES FOR USE BY WHEELCHAIR USERS

(71) Applicant: Bank of America Corporation, Charlotte, NC (US)

(72) Inventor: Donald Joseph Cardinal, San Antonio, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/205,197

(22) Filed: Jul. 8, 2016

(51) Int. Cl.
| | |
|---|---|
| *G07D 11/00* | (2006.01) |
| *G06Q 20/10* | (2012.01) |
| *G07F 19/00* | (2006.01) |
| *G06F 3/041* | (2006.01) |
| *G06Q 20/40* | (2012.01) |

(52) U.S. Cl.
CPC ......... *G06Q 20/1085* (2013.01); *G06F 3/041* (2013.01); *G06Q 20/4012* (2013.01); *G07F 19/203* (2013.01); *G07F 19/204* (2013.01)

(58) Field of Classification Search
USPC .............................. 235/375, 379; 705/43, 16
See application file for complete search history.

(56) References Cited

U.S. PATENT DOCUMENTS

| | | | |
|---|---|---|---|
| 3,703,864 A | 11/1972 | Bradford | |
| 3,946,206 A | 3/1976 | Darjany | |
| 4,968,873 A | 11/1990 | Dethloff et al. | |
| 5,313,051 A | 5/1994 | Brigida et al. | |
| 5,693,956 A | 12/1997 | Shi et al. | |
| 5,734,154 A | 3/1998 | Jachimowicz et al. | |
| 5,770,849 A | 6/1998 | Novis et al. | |
| 6,015,092 A | 1/2000 | Postlewaite et al. | |
| 6,173,899 B1 | 1/2001 | Rozin | |
| 6,394,343 B1 | 5/2002 | Berg et al. | |
| 6,724,103 B2 | 4/2004 | Parrault | |

(Continued)

FOREIGN PATENT DOCUMENTS

| | | |
|---|---|---|
| DE | 102009028991 | 8/2009 |
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015.

(Continued)

*Primary Examiner* — Daniel Hess
(74) *Attorney, Agent, or Firm* — Weiss & Arons LLP; Michael A. Springs, Esq.

(57) ABSTRACT

An automated teller machine (ATM) including multiple user screens is provided. The ATM preferably includes an ATM processor, an ATM user information input device and/or an ATM receiver, a customer-facing ATM touch screen configured to display an initial ATM display, an ATM dispenser configured to dispense a cash withdrawal amount in the event that an ATM central processing unit (CPU) receives information relating to a selection of the cash withdrawal amount. The ATM may further include a second, customer-facing, touch screen configured to selectably display an automated teller assist (ATA) display configured to provide a video display of a live teller located at a remote location.

23 Claims, 8 Drawing Sheets

(56) References Cited

U.S. PATENT DOCUMENTS

| | | | |
|---|---|---|---|
| 7,025,277 | B2 | 4/2006 | Forrest et al. |
| 7,270,276 | B2 | 9/2007 | Vayssiere |
| 7,360,682 | B2 | 4/2008 | Shane et al. |
| 7,360,691 | B2 | 4/2008 | Takayama |
| 7,523,856 | B2 | 4/2009 | Block et al. |
| 7,588,183 | B2 | 9/2009 | Shane et al. |
| 7,791,559 | B2 | 9/2010 | Piasecki |
| 7,814,016 | B2 | 10/2010 | Pranger |
| 7,856,116 | B2 | 12/2010 | Rodriguez et al. |
| 7,940,159 | B2 | 5/2011 | Clemens et al. |
| 7,992,789 | B2 | 8/2011 | Borracci |
| 8,237,068 | B2 | 8/2012 | Szaikowski |
| 8,276,823 | B2 | 10/2012 | Chen |
| 8,317,094 | B2 | 11/2012 | Lehman |
| 8,378,932 | B2 | 2/2013 | Fein et al. |
| 8,392,965 | B2 | 3/2013 | Carter et al. |
| 8,413,893 | B2 | 4/2013 | Kim |
| 8,471,782 | B2 | 6/2013 | Muklashy et al. |
| 8,479,981 | B2 | 7/2013 | Carmichael et al. |
| 8,399,889 | B2 | 9/2013 | Wu et al. |
| 8,523,059 | B1 | 9/2013 | Mullen et al. |
| 8,540,151 | B1 | 9/2013 | Snyder et al. |
| 8,678,293 | B2 | 3/2014 | Chen |
| 8,756,680 | B2 | 6/2014 | Shashidhar |
| 8,810,816 | B2 | 8/2014 | Fischer et al. |
| 8,820,638 | B1 | 9/2014 | Cotter et al. |
| 2003/0145205 | A1 | 7/2003 | Sarcanin |
| 2003/0208405 | A1* | 11/2003 | Putman ............. G06Q 20/108 705/16 |
| 2005/0102499 | A1 | 5/2005 | Kosuga et al. |
| 2005/0134461 | A1 | 6/2005 | Gelbman et al. |
| 2005/0173518 | A1 | 8/2005 | Takayama |
| 2006/0016884 | A1* | 1/2006 | Block ................ G06K 19/08 235/381 |
| 2006/0091223 | A1 | 5/2006 | Zellner et al. |
| 2006/0131393 | A1 | 6/2006 | Cok et al. |
| 2006/0261174 | A1 | 11/2006 | Zellner et al. |
| 2007/0273507 | A1 | 11/2007 | Burchell et al. |
| 2007/0279315 | A1 | 12/2007 | Laves et al. |
| 2008/0035736 | A1 | 2/2008 | Tompkin et al. |
| 2008/0158150 | A1 | 7/2008 | Rossman et al. |
| 2009/0039154 | A1 | 2/2009 | Williams et al. |
| 2010/0084476 | A1 | 4/2010 | Zellner et al. |
| 2010/0260388 | A1 | 10/2010 | Garrett et al. |
| 2010/0302206 | A1 | 12/2010 | Yu et al. |
| 2011/0060640 | A1 | 3/2011 | Thompson et al. |
| 2011/0140841 | A1 | 6/2011 | Bona et al. |
| 2011/0178928 | A1 | 7/2011 | Carmichael et al. |
| 2011/0241996 | A1 | 10/2011 | Vesely |
| 2011/0316997 | A1* | 12/2011 | Shirbabadi ............ G07F 19/201 348/78 |
| 2012/0280924 | A1 | 11/2012 | Kummer et al. |
| 2013/0162594 | A1 | 6/2013 | Paulsen et al. |
| 2013/0221112 | A1 | 8/2013 | Lai et al. |
| 2013/0232082 | A1 | 9/2013 | Krawczewicz et al. |
| 2014/0007002 | A1 | 1/2014 | Chang et al. |
| 2014/0081729 | A1 | 3/2014 | Ocher |
| 2014/0093144 | A1 | 4/2014 | Feekes |
| 2014/0114861 | A1 | 4/2014 | Mages et al. |
| 2014/0172700 | A1 | 6/2014 | Teuwen et al. |
| 2014/0226275 | A1 | 8/2014 | Ko et al. |
| 2014/0291406 | A1 | 10/2014 | Ko |
| 2014/0337957 | A1 | 11/2014 | Feekes |
| 2014/0353384 | A1 | 12/2014 | Hoegerl et al. |
| 2015/0077646 | A1 | 3/2015 | Chen et al. |
| 2015/0262052 | A1 | 9/2015 | Pahuja |
| 2016/0004945 | A1 | 1/2016 | Wade |
| 2016/0054479 | A1 | 2/2016 | Ho et al. |
| 2016/0085325 | A1 | 3/2016 | Lee et al. |
| 2016/0171461 | A1* | 6/2016 | Hoover ............. G06F 3/0488 705/43 |
| 2016/0210453 | A1 | 7/2016 | Seo et al. |
| 2016/0224528 | A1 | 8/2016 | Trevarthen et al. |

OTHER PUBLICATIONS http://www.us.schott.com/innovation/ultrathinglass/, Retrieved on Sep. 14, 2016.
"Schott's Reliable and Strong Ultra-Thin Glass Features in Fingerprint Sensors in new Smartphones," Retrieved on Sep. 14, 2016.
Ron Martens, "The OLED Handbook, A Guide to OLED Technology, Industry & Market," 2015 Edition.
Bryce Kellogg, Vamsi Talla, Shyamnath Gollakota and Joshua R. Smith, "Passive Wi-Fi: Bringing Low Power to Wi-Fi Transmissions," Retrieved on May 11, 2016.
Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.
"MAX2837—2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.
Martyn Williams, "Samsung, LG Show Flexible OLED, E-Paper Screens," Nov. 10, 2010.
"Electronic Paper," Jun. 10, 2016, Wikimedia Foundation, Inc.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.

(56) References Cited

OTHER PUBLICATIONS

"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

\* cited by examiner

MULTI-SCREEN AUTOMATED TELLER MACHINE (ATM)/AUTOMATED TELLER ASSIST (ATA) MACHINES FOR USE BY WHEELCHAIR USERS

FIELD OF THE INVENTION

This invention relates to automated teller machines (ATM) and automated teller assist machines (ATA).

BACKGROUND OF THE INVENTION

Wheelchair users typically have a difficult time accessing various public-facing machines at least because such public-facing machines are typically designed for ambulatory individuals. ATMs and, to a lesser extent, ATAs are typical examples of machines that present difficult access for wheelchair users because the great majority of ATMs and ATAs are built for ambulatory individuals.

Certain inventions have been developed in order to provide wheelchair users full access to an ATM. U.S. Pat. No. 8,723,941, entitled "Handicap-Accessible ATM", which is hereby incorporated by reference herein in its entirety, is directed to systems and methods for providing an ATM that includes a display screen and a lifting mechanism to either raise the ATM or drop the ATM, as needed by the customer.

It would be desirable to provide an ATM and/or ATA machine that is accessible by wheelchair users, but that provides such access independent of moving systems such as a lifting mechanism.

SUMMARY OF THE DISCLOSURE

An automated teller machine (ATM) including multiple user screens is provided. The ATM preferably includes an ATM processor configured to determine if a data structure associated with input information validates a user at the ATM. In some embodiments, the processor may be configured to determine if a data structure associated with input information corresponds to a personal identification number (PIN) corresponds to a valid PIN. The determination is preferably based at least in part on user identification information. It should be noted that while a portion of this specification is directed toward embodiments involving inputting a PIN, and determining validity thereof, embodiments of the invention may also be used with alternatives to inputted PIN information. Such alternatives may include receiving Near Field Communication Signals (NFC), receiving Bluetooth Signals, optically capturing a QR Code displayed on a mobile device, optically capturing a bar code displayed on a mobile device, or receiving any other suitable electronic form of information.

The ATM may also include a first ATM keypad configured to receive information corresponding to the PIN. In certain embodiments, the first ATM keypad may be the only ATM keypad.

The ATM also preferably includes a first ATM receiver configured to receive the user identification information. The ATM may also include a first, customer-facing, ATM touch screen configured to display, in the event that an ATM processor determines that the data structure associated with the information corresponding to the PIN corresponds to a valid PIN, or to other sufficiently validating information, an initial ATM display. The ATM also includes a first ATM dispenser configured to dispense a cash withdrawal amount in the event that an ATM central processing unit (CPU) receives information relating to a selection of the cash withdrawal amount. In certain embodiments, this first ATM dispenser may be the only ATM dispenser.

The ATM may also include a second ATM keypad configured to receive information corresponding to the PIN, or other receiving device such as a mechanism configured to receive Near Field Communication Signals (NFC), Bluetooth Signals, a QR Code displayed on a mobile device, a bar code configured to some other information. The ATM may also include a second ATM receiver configured to receive user identification information.

The ATM also preferably includes a second, customer-facing, ATM touch screen configured to display, in the event that the ATM processor determines that the data structure associated with the information corresponding to the PIN, or to the NFC signals, Bluetooth Signals, the QR Code displayed on a mobile device, or the bar code displayed on a mobile device, corresponds to a valid PIN and the ATM processor receives a selection from a customer to activate the second ATM touch screen, the initial ATM display. The ATM may also include a second ATM dispenser configured to dispense a cash withdrawal amount in the event that an ATM central processing unit (CPU) receives information relating to a selection of the cash withdrawal amount.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

An automated teller machine (ATM) comprising multiple user screens is provided. The ATM preferably includes an ATM processor that is configured to determine if a data structure associated with the information corresponding to a personal identification number (PIN) corresponds to a valid PIN. This determination is preferably based at least in part on user identification information.

In some embodiments, the ATM may include a first ATM keypad configured to receive information corresponding to the PIN. The ATM keypad may be a soft keypad that is embedded and/or displayed in a touch-sensitive ATM screen. It should be noted that the ATM keypad is preferably one of a number of different choices for input of user information. As such, embodiments set forth herein may not require an ATM keypad. Other embodiments, however, may require an ATM keypad.

The ATM may also include an ATM receiver configured to receive the user identification information. Such user identification information may be stored in a magnetic stripe located on a banking card associated with the user. Such information may be stored in a mobile device associated with a user. Such a mobile device may preferably be configured for transmitting information using a bar code displayed on the mobile device, a QR code displayed on the mobile device, near field communication (NFC) from the device or any suitable communication device.

Such an ATM receiver may receive the user identification information using a magnetic stripe reader. Such a receiver may receive the user identification information using an NFC transceiver or an NFC receiver. Such a receiver may include a receiver for optically capturing information stored in a bar code or a QR code. Such a receiver may be any suitable receiver for receiving information from the user.

The ATM may also include a first, customer-facing, ATM touch screen. The first ATM screen is preferably configured to display an initial ATM display in the event that an ATM processor determines that the data structure associated with the information corresponding to the PIN corresponds to a valid PIN.

The ATM may also include a first ATM dispenser configured to dispense a cash withdrawal amount in the event that an ATM central processing unit (CPU) receives information relating to a selection of the cash withdrawal amount.

In some embodiments, the ATM may also include a second ATM keypad configured to receive information corresponding to the PIN. Such an ATM may also include a second ATM receiver configured to receive user identification information as well as a second, customer-facing, ATM touch screen. The second ATM touch screen may preferably be configured to display, in the event that the ATM processor determines that the data structure associated with the information corresponding to the PIN corresponds to a valid PIN and the ATM processor receives a selection from a customer to activate the second ATM touch screen, the initial ATM display.

The ATM may also be configured to receive a second ATM dispenser configured to dispense a cash withdrawal amount in the event that an ATM central processing unit (CPU) receives information relating to a selection of the cash withdrawal amount.

In certain embodiments, one or more of the multiple ATM touch screens may include an array of organic light emitting diodes (OLEDs) forming one or more pixels. Preferably, only a single one of the first ATM touch screen and the second ATM touch screen are available for use at one time. Nevertheless, certain embodiments may also operate such that more than one of the multiple screens may be operable at a single time.

In some embodiments, the first ATM touch screen may preferably positioned at a first height and the second ATM touch screen may be positioned at a second height, the first height being different from the second height. In certain embodiments, the first ATM touch screen may be positioned above, or even directly above, the second ATM touch screen. In some embodiments, the first ATM touch screen may be positioned side-by-side the second ATM touch screen. In some embodiments one of the touch screens may be for use as an ATM and another for use as an ATA.

Another embodiment relates to ATM including multiple user screens. The ATM processor may be configured to determine if a data structure associated with the information corresponding to the PIN, or information corresponding to other transmitted information, corresponds to a valid PIN or electronically-transmitted information, the determination being based at least in part on user identification information.

The ATM may, optionally, also include a keypad configured to receive information corresponding to the personal identification number (PIN), a receiver configured to receive the user identification information, a first, customer-facing, ATM touch screen configured to display an initial ATM display, an ATM dispenser configured to dispense the cash withdrawal amount in the event that an ATM central processing unit (CPU) receives information relating to a selection of a cash withdrawal amount and a second, customer-facing, ATM touch screen configured to selectably display the initial display. The keypad, the receiver and the dispenser may preferably be located between the first customer-facing ATM touch screen and the second, customer-facing, ATM touch screen. In certain embodiments, the second, customer-facing, ATM touch screen may be further configured to selectably display an automated teller assist (ATA) display comprising a video display of a live teller located at a remote location. Preferably, only a single one of the first ATM touch screen and the second screen are available for use at one time.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

Figure 1:
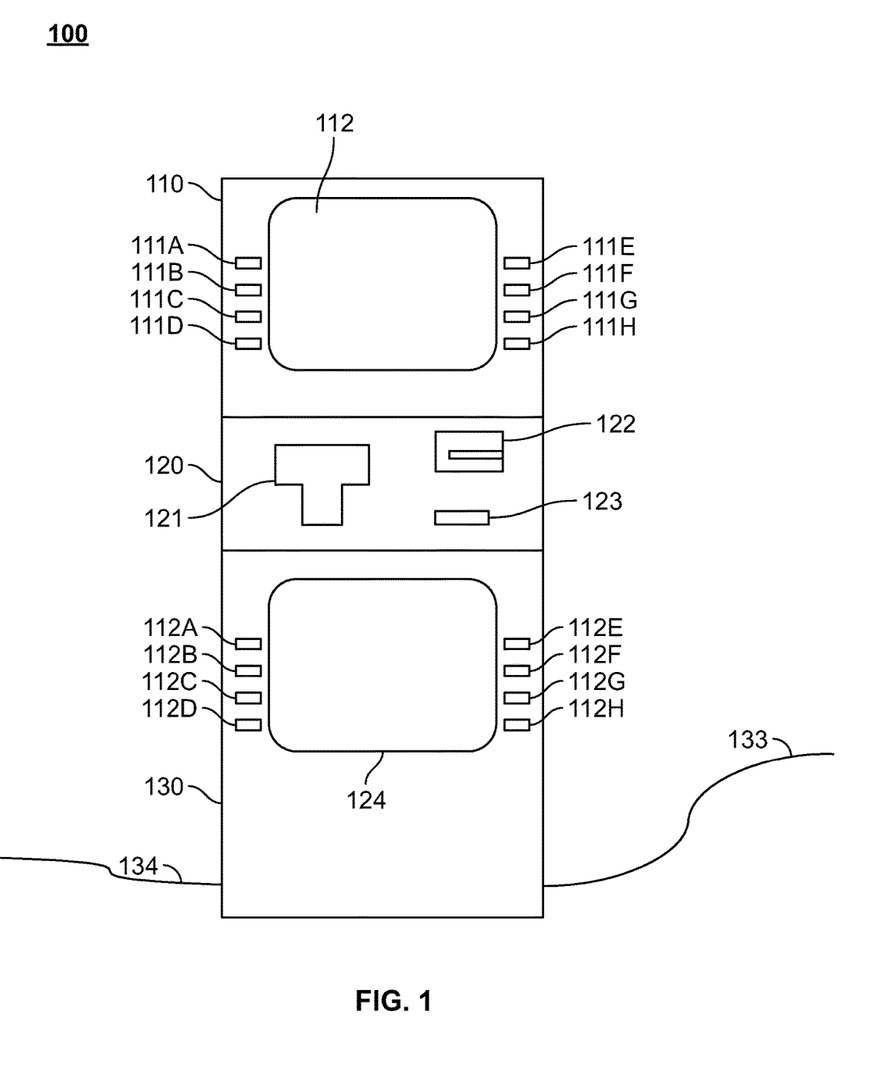
FIG. 1 shows an illustrative diagram according to certain embodiments.

FIG. 1 shows an illustrative diagram according to certain embodiments. FIG. 1 is a schematic diagram showing an embodiment of an ATM 100 which may include an upper portion 110, a middle portion 120 and a lower portion 130.

The upper portion 110 may include multiple components, a display screen 112 and a set of buttons 111A-111H. Preferably the upper portion 110 is environmentally sealed to prevent damage to the display screen 112 and the buttons 111A-111G due to environmental conditions.

The middle portion 120 may include multiple components such as a cash dispenser 121, a card reader 122 and a printer 123. Each of cash dispensers 121, card readers 122, and printer 123 may be weatherproof—i.e., angled or shielded so that liquids do not readily enter the device and/or contain flaps or sumps that prevent liquids, mud etc. from clogging or damaging the components and/or ATM device 100.

Card reader 122 may be configured to read magnetic stripe cards, smartcards, EMV-equipped card, contactless (EMV-equipped) cards or any other suitable card. Printer 123 may be configured to print on plastic film and/or paper with or without waterproof ink.

Lower portion 130 may include a display screen 124 and a set of buttons 112A-112H. Preferably, lower portion 130 is also environmentally sealed to prevent damage to the display screen 124 and buttons 112A-112G.

Lower portion 130 may be connected to a network via one or more components such as a cable connection 133, and/or a land line connection 134, a cellular connection (not shown), a WiFi connection (not shown) and/or a GPS connection (not shown). Other suitable connections—e.g., satellite modems, Bluetooth®, near field connectivity—are also contemplated and are included within the scope of the invention.

It should be noted that a touch screen functionality of screens 112 and 124 may replace and/or augment buttons 111A-111H and 112A-112H, respectively.

In certain embodiments of the invention, buttons 111A-111H and 112A-112H may be located on a separate console (not shown) that is mounted on the wall proximal to the ATM device. Such a wall-mounted console may preferably be easily-accessible even if the ATM device was currently located in a relatively less accessible position. Such an accommodation, which may be provided by presenting an ATM interface such as an ATM touch screen at the vertical level of a wheelchair user, may enable access to the ATM device by a person in a wheelchair.

The buttons may communicate with the ATM device via any suitable method—e.g., Bluetooth®. The button console may be mounted in a detachable fashion to permit easier access for wheelchair users. Suitable security features may be incorporated into the console to prevent theft of the console.

Figure 2A:
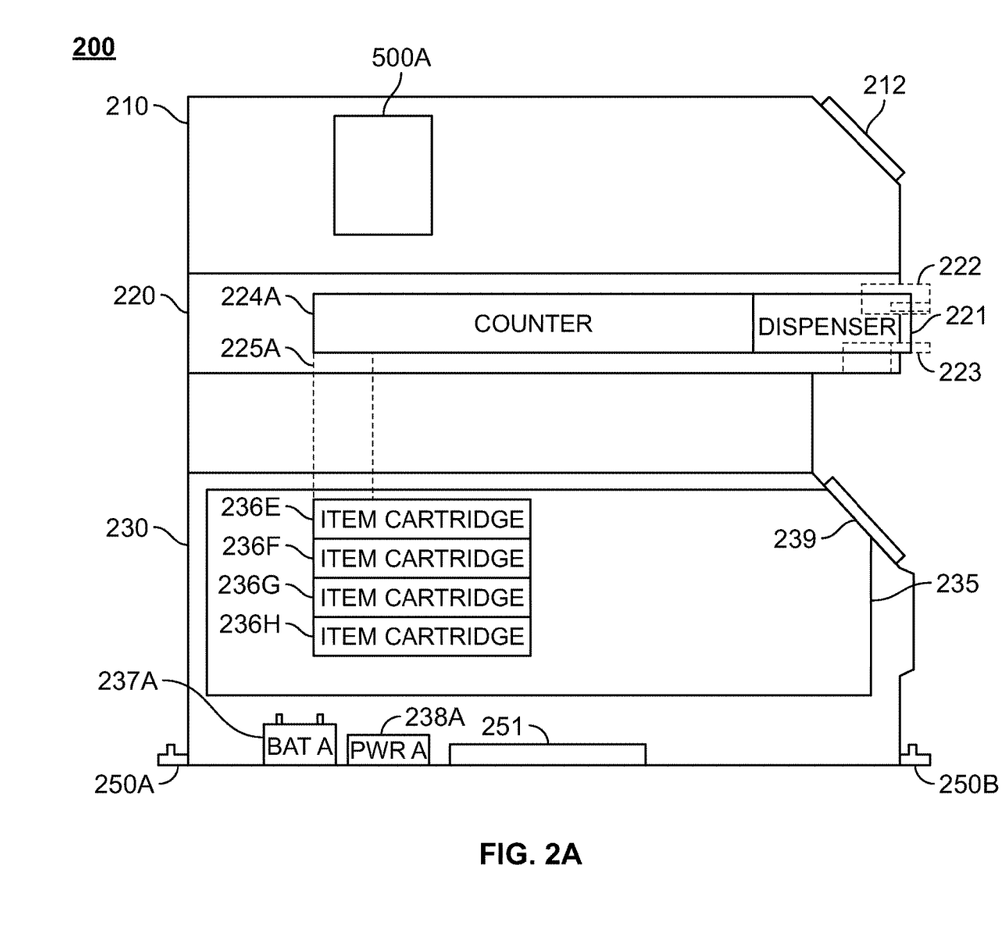
FIGS. 2A-2C shows an illustrative, schematic, cut-away side view according to certain embodiments.
Figure 2B:
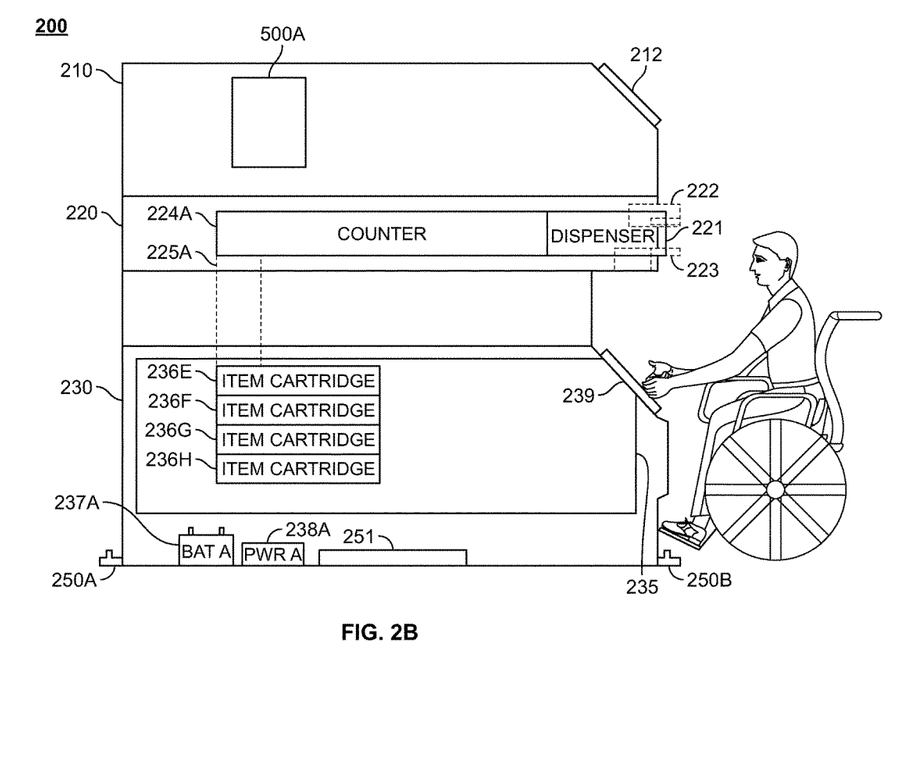
Figure 2C:
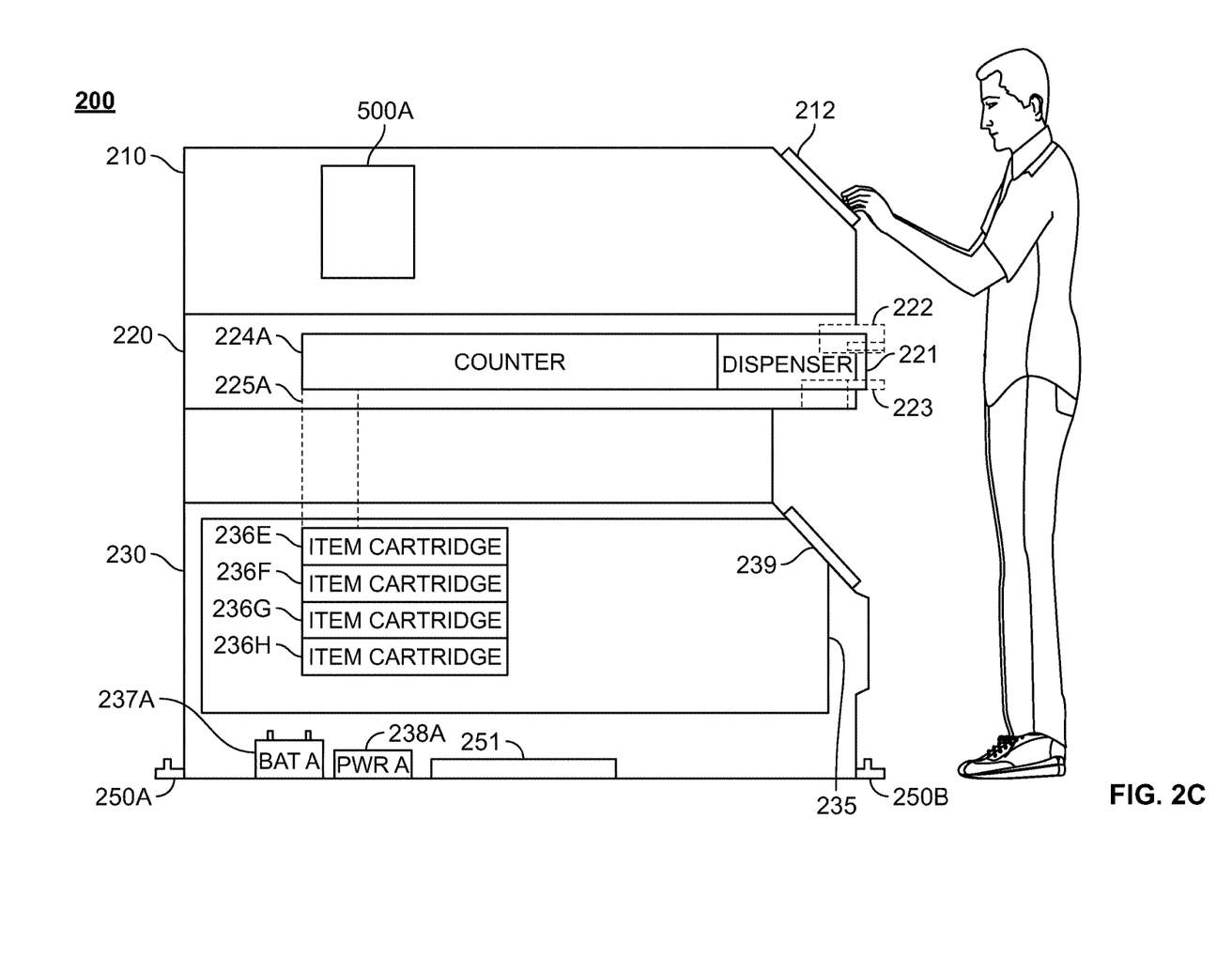

FIGS. 2A-2C shows an illustrative, schematic cut-away side view according to certain embodiments.

ATM device 200 may have some or all of the features of ATM 100. ATM 200 may include an upper portion 210, a middle portion 220 and a lower portion 230. The upper portion 210 may include a display screen 212 and circuit board 500A which may include software and/or hardware to operate ATM 200.

The middle portion 220 may include multiple components such as a cash dispenser 221, a card reader 222 and a printer 223. Cash dispenser 221 may receive items from item counter 224. It should further be noted that, in some embodiments of the invention, cash dispenser 221, card reader 222 and printer 223 may operate in response to commands received either from screen 212 and buttons associated therewith, or screen 239 and buttons associated therewith. It should be further noted that in preferable embodiments of the invention, cash dispenser 221, card reader 222 and printer 223 may operate only in response to commands received either from screen 212 and buttons associated therewith, or screen 239 and buttons associated therewith, but not both at the same time. In some such embodiments, the receipt of a command from one of screens 212, or buttons associated therewith, and screen 239, or buttons associated therewith, may foreclose, and, in some embodiments, shut down, operation of the other screen.

Card reader 222 may be configured to read magnetic stripe cards, smartcards, EMV-equipped card, contactless (EMV-equipped) card or any other suitable card.

Lower portion 230 may include components of a portion of the mechanical systems which provide the functionality of ATM 200. Item cartridges 236E-236H may provide items to counter 224 via chute 225. Item cartridges 236E-236H may be contained in vault 235. Vault 235 may surround some or all of the components of ATM 200.

Figure 3:
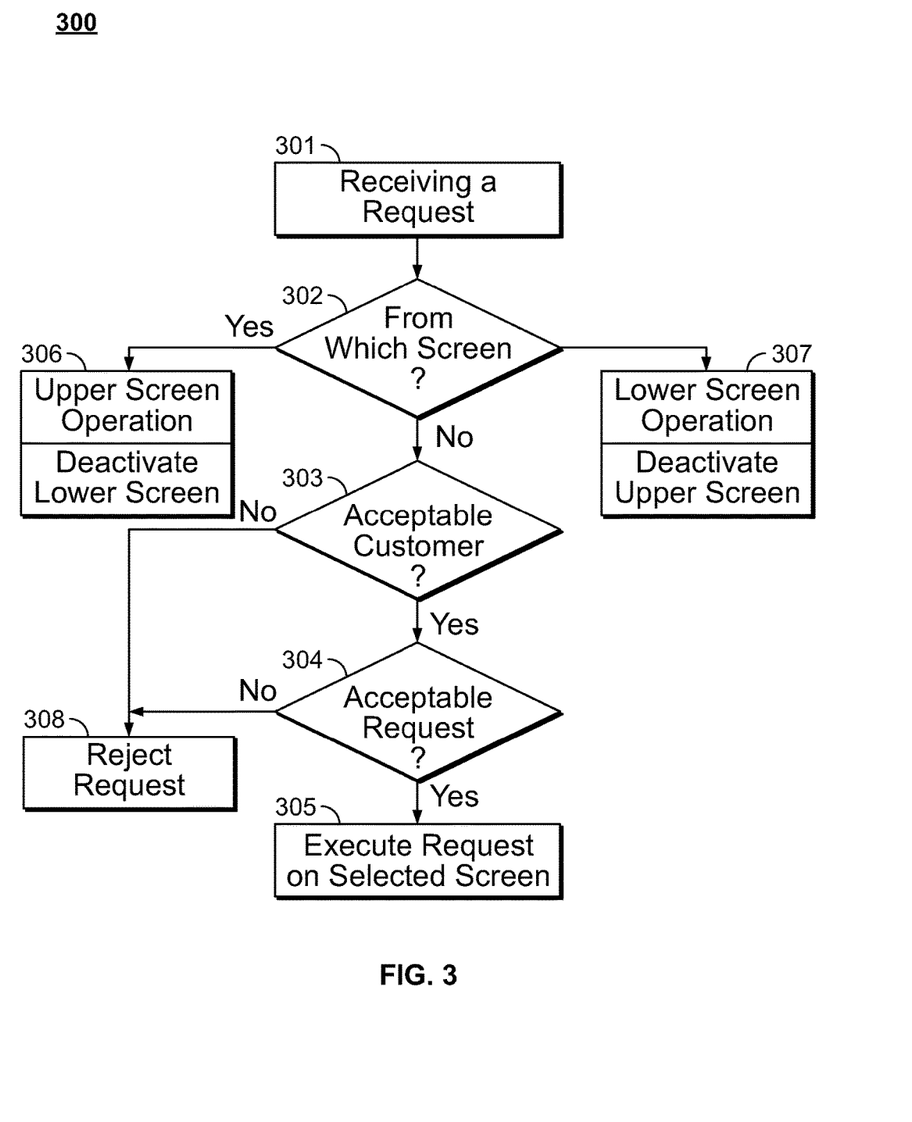
FIG. 3 shows an illustrative flow diagram according to certain embodiments.

FIG. 3 shows an illustrative flow diagram according to certain embodiments. Step 301 shows receiving a request for an ATM operation. Step 302 shows querying from which screen, or which set of associated buttons (not shown), the request was received.

If the query determines that the upper screen is operational, step 306 shows deactivating the lower screen. If the query determines that the lower screen is operational, step 307 shows deactivating the upper screen.

Step 303 shows that the ATM may then query whether the customer is an acceptable customer—e.g., does the information input by the customer correspond to information stored on a customer identification instrument like a smart card, mobile device, etc. If the customer is determined to be an acceptable customer, the process proceeds to query, at step 304, whether the request is an acceptable request. Examples of an acceptable request may include a request for an amount of funds which is lower than the amount of funds held in a customer's account.

If, at step 304, the request is determined to be an acceptable request, then the process, at step 305, proceeds to execute the request shown on the selected screen.

If either the customer is not an acceptable customer, or the request is not an acceptable request, the request is rejected at step 308.

Figure 4:
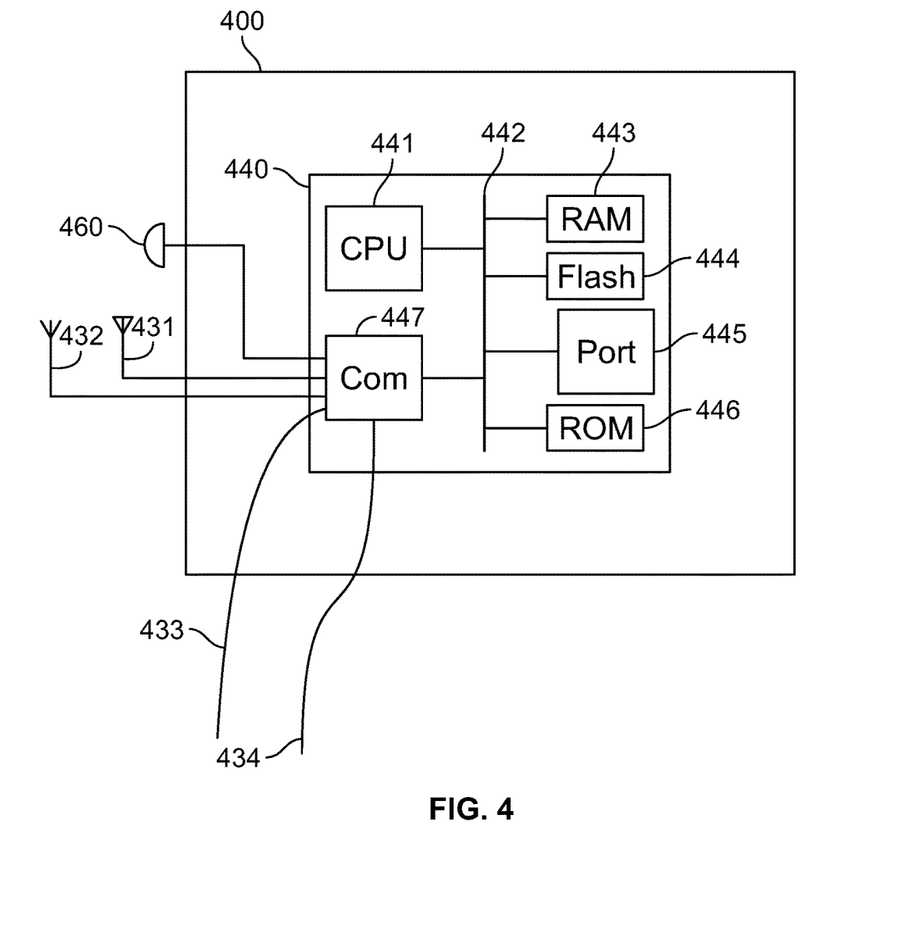
FIG. 4 shows an exemplary circuit board according to certain embodiments.

FIG. 4 shows an exemplary circuit board 400 which may form a portion of an ATM according to the invention. Circuit board 400 may include CPU 441, bus 442, RAM 443, flash memory 444, port(s) 445 (for operation of apparatus such as a printer, display, keypad etc.), ROM 446 and communications sub-system 447. Communications sub-system 447 may include a satellite modem, Bluetooth®, near field connectivity or other communication system or device, and may connect to cable connection 433, land line connection 434, cellular connection 432, WiFi connection 431 and/or GPS connection 460. It should be noted, in systems and methods according to the invention, port(s) 445 may be used for additional connectivity to sensors, cameras, etc., or other devices.

Figure 5:
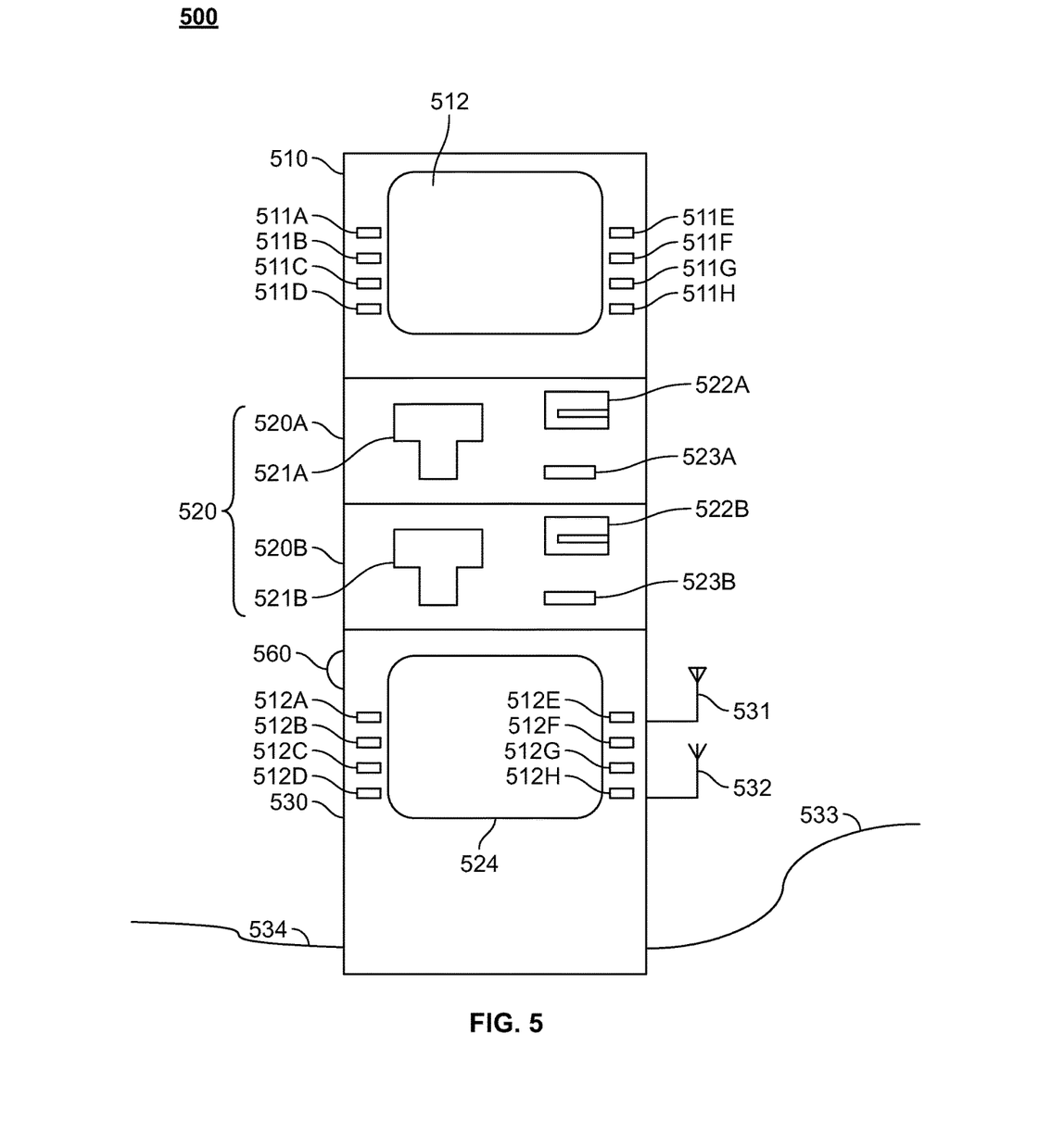
FIG. 5 shows another illustrative front view of and ATM according to certain embodiments.

FIG. 5 shows a front view of another illustrative ATM according to certain embodiments. FIG. 5 is a schematic diagram showing an embodiment of an ATM 500 which may include an upper portion 510, a middle portion 520 and a lower portion 530.

The upper portion 510 may include multiple components, a display screen 512 and a set of buttons 511A-511H. Preferably the upper portion 510 is environmentally sealed to prevent damage to the display screen 512 and the buttons 511A-511H due to environmental conditions.

The middle portion 520 may include two sections—an upper section 520A and a lower section 520B. Upper section 520A corresponds to screen 512 and associated buttons 511A-511H. Upper section 520A preferably includes multiple components such as a cash dispenser 521A, a card reader 522A and a printer 523A.

Upper section 520A corresponds to screen 512 and associated buttons 511A-511H. Upper section 520A preferably includes multiple components such as a cash dispenser 521A, a card reader 522A and a printer 523A.

Card reader 522A may be configured to read magnetic stripe cards, smartcards, EMV-equipped card, contactless EMV-equipped cards or any other suitable card. Printer 523A may be configured to print on plastic film and/or paper with or without waterproof ink.

Lower section 520B of middle portion 520 corresponds to screen 524 and associated buttons 512A-512H. Lower section 520B preferably includes multiple components that are separate and apart from upper section 520A and components associated therewith. Components associated with lower section 520B include a cash dispenser 521B, a card reader 522B and a printer 523B. Lower section 520B corresponds to screen 524 and associated buttons 512A-512H.

Card reader 522B may be configured to read magnetic stripe cards, smartcards, EMV-equipped card, contactless EMV-equipped cards or any other suitable card. Printer 523B may be configured to print on plastic film and/or paper with or without waterproof ink.

Preferably, lower portion 530 is also environmentally sealed to prevent damage to the display screen 524 and buttons 512A-512G.

Lower portion 530 may be connected to a network via one or more components such as a cable connection 533, a land line connection 534, a cellular connection 532, a WiFi connection 531 and/or a GPS connection (not shown). Other suitable connections—e.g., satellite modems, Bluetooth®, near field connectivity—are also contemplated and are included within the scope of the invention.

It should be noted that while FIG. 5 shows the two ATM screens as one above the other, it is also within the scope of the invention to provide the two ATM screens as one side-by-side with the other.

It should be further noted that the ability to put one ATM directly above the other, one ATM above the other, or one ATM side-by-side with an ATA display, as described herein, is preferably enabled by the use of OLED, or other sufficiently shallow-screened or flat-screened, technology. Preferably such technology enables, by reducing the internal space requirements of the screen, the placement of screens in previously un-exploited locations, such as the placement of screen 124 in FIG. 1, the placement of screen 239 in FIGS. 2A-2C and screen 524 in FIG. 5.

Figure 6:
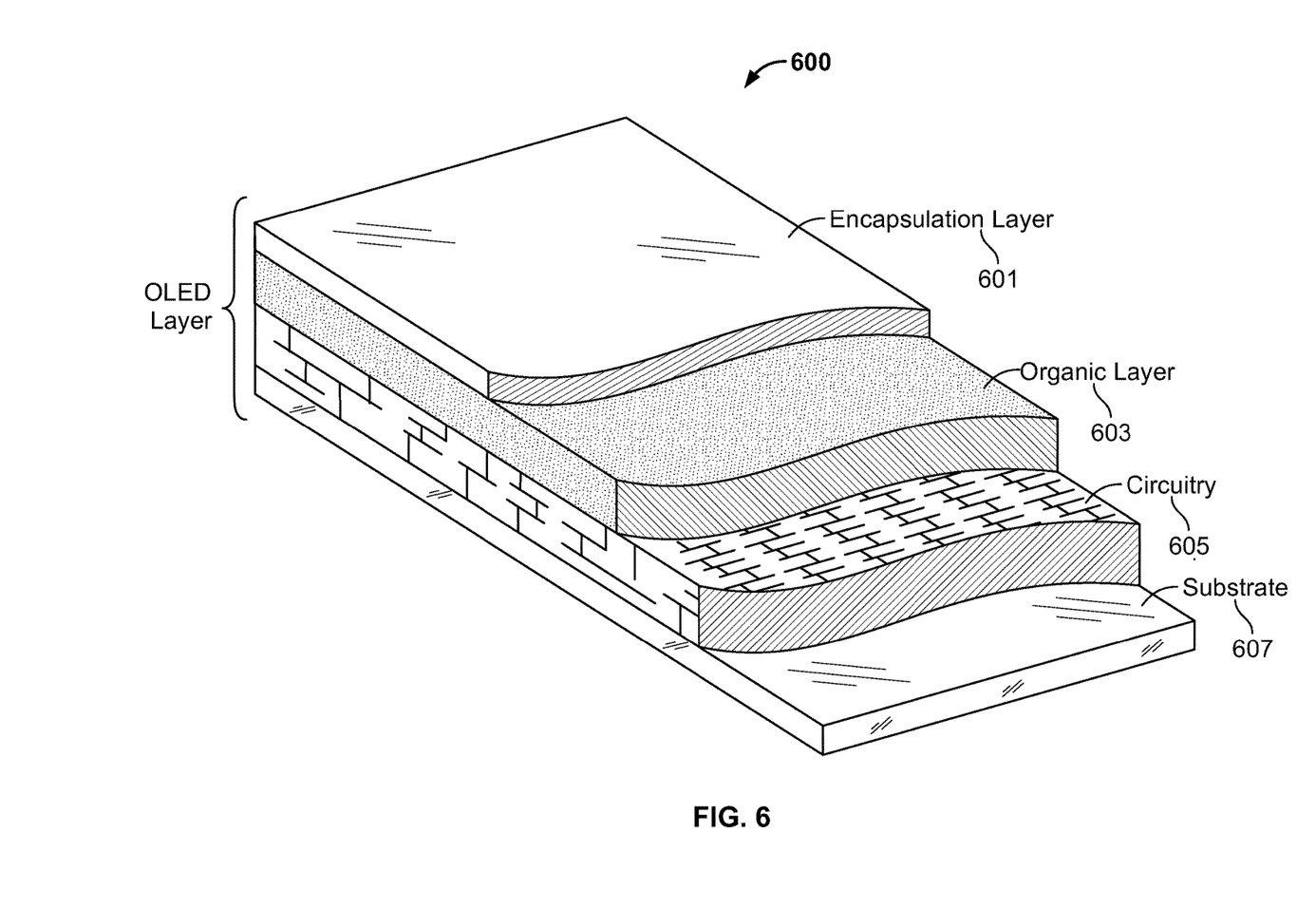
FIG. 6 shows structures of an illustrative OLED layer according to certain embodiments.

FIG. 6 shows structures 600 of an illustrative OLED layer that may be used for screens 124 in FIG. 1, the screen 239 in FIGS. 2A-2C and screen 524 in FIG. 5 or any other suitable screen set forth herein. It should be noted that other suitable OLED, or other structures, may be used without departing from the scope of the invention. Nevertheless, the illustrative OLED structures that are set forth herein preferably describe a preferred embodiment of an OLED structure that promotes a screen that is substantially flat, but sufficiently emissive to provide the necessary light needed for an ATM display and/or an ATA display.

Structures 600 include four layers: encapsulation layer 601, organic layer 603, circuitry layer 605 and substrate layer 607.

Encapsulation layer 601 protects organic layer 603 from exposure to oxygen, water and other contaminants. Preferably, encapsulation layer 601 protects organic layer 603, and is flexible and transparent. A common material for constructing encapsulation layer 601 includes glass. When glass is used for encapsulation layer 601, the glass may be very thin and flexible. For example, the glass may be between 50 micrometers (um) and 100 um thick. The structures, when taken in total, should preferably be between 200 and 300 um thick thus allowing for a very small depth footprint associated with the screen.

In some embodiments, encapsulation layer 601 may be constructed using Thin-Film Encapsulation techniques such as Atomic Layer Deposition (ALD). ALD is a process that utilizes chemicals that react to create a solid thin film.

Structures 600 include organic layer 603.

Organic layer 603 typically includes an emissive solid-state semiconductor. For example, organic layer 603 may include one or more light emitting diodes. Organic layer 603 may be constructed from a thin film of organic (carbon-based) material. When electricity is applied to a diode within organic layer 603, electrons flow through organic layer 603 and release photons, thereby emitting light. Different types of emissive materials may be used. Each type of material may be associated with a different color light. An intensity of light emitted by organic layer 603 may be controlled by the amount of electricity flowing through organic layer 603.

Organic layer 603 may be doped with "host" materials. Host material may affects properties, such as efficiency, of organic layer 603. For example, organic layer 603 may be doped with emitter materials that improve its operation and/or achieve a desired color.

Organic layer 603 may include two or more sub-layers (not shown). For example, organic layer 603 may include 5, 10 or 15 sublayers. The sub-layers may enhance an efficiency of the emissive layer. Illustrative sub-layers may include: (1) an electron transport layer, (2) a blocking layer, (3) an emissive layer, (4) a hole transport layer and an (5) injection layer.

In operation, an emissive layer may be placed between a cathode and an anode. When electricity is applied, electrons flow from the cathode to the anode. OLED devices are typically driven by current. The cathode inserts electrons into the emissive layer, and the anode removes electrons. The electron "flow" through the emissive layer releases photons generating light. The color of the generated light may be changed by using different types of materials for the emissive layer. An intensity of the generated light may be controlled by the amount of electricity applied.

A direction of light emitted by the organic layer may be controlled by transparency of the anode and cathode. In some embodiments, the cathode, positioned over a top of organic layer 603 may be reflective. Such a cathode may be constructing using an aluminum based-compound or lithium fluoride. An anode positioned underneath organic layer 603 may be transparent. A transparent anode may preferably be constructed using indium tin oxide. In such embodiments, light is then emitted through circuitry layer 605 and substrate 607. Such embodiments may be referred to as "bottom-emitting OLEDs."

In some embodiments, the cathode positioned over a top of organic layer 603 may be transparent. Such a cathode may preferably be constructing using indium tin oxide. The anode may be reflective and positioned underneath organic layer 603. The reflective anode reflects the light back through the transparent cathode. Typically, top-emitting designs are more efficient and are used to construct higher resolution displays.

Additionally, top-emitting designs may allow the organic layer to be formed on non-transparent substrates. Small- and medium-sized OLED displays are typically constructed using top-emitting techniques.

Organic layer 603 may form one or more pixels. Different architectures are available for forming pixels. One architecture includes positioning different color (e.g., red, green and blue) diodes adjacent to each other. Another architecture includes stacking different color diodes on top of each other. Diodes may be stacked because materials used to construct OLED layer 603 may be transparent. Stacked design may provide a smaller pixel size and higher resolution.

Structures 600 include circuitry layer 605. Circuitry layer 605 includes electronics that drive one or more pixels formed within organic layer 603. Typically, amorphous silicon (a-Si) and low temperature polysilicon (LTPS) are used to construct circuitry layer 605. In some embodiments, circuitry layer 605 may be transparent.

Substrate layer 607 supports circuitry layer 605, organic layer 603 and encapsulation layer 601. Substrate layer 601 may be constructed using various materials. For example, substrate layer 607 may be constructed using glass, plastic or metal materials. In some embodiments, substrate layer 607 may function as encapsulation layer 601.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for multi-screen automated teller machine/automated teller assist machines are provided. Persons skilled in the art will appreciate that the present invention can be practiced by other than the described embodiments, which are presented for purposes of illustration rather than of limitation, and that the present invention is limited only by the claims that follow.

What is claimed is:

1. An automated teller machine (ATM) comprising multiple user screens, the ATM comprising:
    a first ATM receiver configured to receive input user identification information;
    a first customer-facing ATM touch screen and a second customer-facing ATM touch screen, the first customer-facing ATM touch screen positioned at a first location, said first location occupies a first portion of the ATM, the second customer-facing ATM touch screen positioned at a second portion of the ATM, said second portion of the ATM is different from the first portion of the ATM;
    an ATM processor configured to determine if a data structure associated with the user identification information corresponds to one of either the first or the second portion of the ATM;
    a sensor device configured to detect the position of a user's eyes relative to the first and second customer-facing ATM touch screens, this position defines transmitted information, the sensor device is further configured to send the transmitted information to the ATM processor;
    the ATM processor is further configured to calculate an ideal angle and to determine which of the first and second customer-facing ATM touch screens is within the ideal angle, the ideal angle is defined as the angle at which a display screen, positioned relative to the location of a user's eyes, affords the user the minimum glare;
    the first customer-facing ATM touch screen is configured to automatically display, in the event that the ATM processor determines that either the first customer-facing ATM touch screen is within the ideal angle or if neither the first nor second customer-facing ATM touch screen are within the ideal angle, if the data structure associated with the user identification includes data corresponding to the first portion of the ATM, an initial ATM display;
    a first ATM dispenser configured to dispense a cash withdrawal amount in the event that an ATM central processing unit (CPU) receives information relating to a selection of the cash withdrawal amount;
    the second customer-facing ATM touch screen is configured to automatically display, in the event that the ATM processor determines that either the second customer-facing ATM touch screen is within the ideal angle or if neither the first nor second customer-facing ATM touch screen are within the ideal angle, if the data structure associated with the user identification information corresponds to the second portion of the ATM, the initial ATM display; and
    a second ATM dispenser configured to dispense a cash withdrawal amount in the event that an ATM central processing unit (CPU) receives information relating to a selection of the cash withdrawal amount.

2. The ATM of claim 1, wherein each of the first ATM touch screen and the second ATM touch screen comprises an array of organic light emitting diodes ("OLEDs") forming one or more pixels.

3. The ATM of claim 1, wherein only a single one of the first ATM touch screen and the second ATM touch screen are available for use at one time.

4. The ATM of claim 1, wherein the first ATM touch screen is positioned at a first height and the second ATM touch screen is positioned at a second height, the first height being different from the second height.

5. The ATM of claim 1, wherein the first ATM touch screen is positioned at a first height and the second ATM touch screen is positioned at a second height, said first ATM touch screen being positioned directly above the second ATM touch screen.

6. The ATM of claim 1, wherein the first ATM touch screen is positioned either above the second ATM touch screen or alongside the second ATM touch screen.

7. The ATM of claim 1, wherein the first ATM receiver is one item selected from the group consisting of: a card identifier, a bar code reader, a QR code reader, a near field communication receiver, a magnetic stripe reader, and any combination thereof.

8. An automated teller machine (ATM) comprising multiple user screens, the ATM comprising:
    an ATM processor configured to determine if a data structure is associated with a pre-determined ATM touch screen, the determination is based entirely on user identification information;
    only a single ATM keypad configured to receive information;
    a first customer-facing ATM touch screen and a second customer-facing ATM touch screen;
    an ATM receiver configured to receive the user identification information;
    a sensor device configured to detect the position of a user's eyes relative to the first and second customer-facing ATM touch screens, this position defines transmitted information, the sensor device is further configured to send the transmitted information to the ATM processor;
    the ATM processor is further configured to calculate an ideal angle and to determine which of the first and second customer-facing ATM touch screens is within the ideal angle, the ideal angle is defined as the angle at which a display screen, positioned relative to the location of a user's eyes, affords the user the minimum glare;

the first customer-facing ATM touch screen configured to automatically display, in the event that the ATM processor determines that either the first customer-facing ATM touch screen is within the ideal angle or if neither the first nor second customer-facing ATM touch screen are within the ideal angle, if the data structure associated with the user identification information corresponding to the first customer-facing ATM touch screen, an initial ATM display;

only a single ATM dispenser configured to dispense the cash withdrawal amount in the event that an ATM central processing unit (CPU) receives information relating to a selection of a cash withdrawal amount; and the second customer-facing ATM touch screen configured to automatically display the initial ATM display, in the event that the ATM processor determines that either the second customer-facing ATM touch screen is within the ideal angle or if neither the first nor second customer-facing ATM touch screen are within the ideal angle, if the user selects display on the second customer-facing, or the user identification information corresponds to the second customer-facing ATM touch screen;

wherein the single ATM keypad, the ATM receiver and the single ATM dispenser are located between the first customer-facing ATM and the second customer-facing ATM touch screen.

9. The ATM of claim 8 wherein the second, customer-facing, ATM is further configured to selectably display an automated teller assist ("ATA") display comprising a video display of a live teller located at a remote location.

10. The ATM of claim 8, wherein each of the first ATM touch screen and the second ATM touch screen comprises an array of organic light emitting diodes (OLEDs) forming one or more pixels.

11. The ATM of claim 8, wherein at least one of the first ATM touch screen and the second ATM touch screen comprises an array of organic light emitting diodes (OLEDs) forming one or more pixels.

12. The ATM of claim 8, wherein the first ATM touch screen is positioned above the second ATM touch screen or alongside the second ATM touch screen.

13. The ATM of claim 8, wherein the ATM receiver is one item selected from the group consisting of: a card identifier, a bar code reader, a QR code reader, a near field communication receiver, a magnetic stripe reader, and any combination thereof.

14. The ATM of claim 8, wherein only a single one of the first ATM touch screen and the second screen are available for use at one time.

15. The ATM of claim 8, wherein the first ATM touch screen is positioned at a first height and the second ATM touch screen is positioned at a second height, the first height being different from the second height.

16. The ATM of claim 8, wherein the first ATM touch screen is positioned at a first height and the second ATM touch screen is positioned at a second height, said first ATM touch screen being positioned directly above the second ATM touch screen.

17. An automated teller machine (ATM) comprising multiple user screens, the ATM comprising:

an ATM processor configured to determine if a data structure associated with inputted user information corresponds to a valid data structure, the determination being based at least in part on user identification information;

a sensor device configured to detect the position of a user's eyes relative to the multiple screens, this position defines transmitted information, the sensor device is further configured to send the transmitted information to the ATM processor;

the ATM processor is further configured to calculate an ideal angle and to determine which of the first and second customer-facing ATM touch screens is within the ideal angle, the ideal angle is defined as the angle at which one of the multiple screens, positioned relative to the location of a user's eyes, affords the user the minimum glare;

an ATM user input device configured to receive the inputted user information;

an ATM receiver configured to receive the user identification information;

a customer-facing ATM touch screen configured to automatically display, only in the event either the customer-facing ATM touch screen is within the ideal angle or if none of the multiple screens are within the ideal angle, if the ATM processor determines that the data structure associated with the inputted user information corresponds to valid information and the customer-facing ATM touch screen, an initial ATM display;

an ATM dispenser configured to dispense a cash withdrawal amount in the event that an ATM central processing unit (CPU) receives information relating to a selection of the cash withdrawal amount; and a second, customer-facing, touch screen configured to selectably display an automated teller assist ("ATA") display configured to provide a video display of a live teller located at a remote location.

18. The ATM of claim 17, further comprising a second ATM dispenser configured to dispense the cash withdrawal amount in the event that an ATM central processing unit (CPU) receives information relating to a selection of the cash withdrawal amount included in the initial ATM display on the second ATM touch screen.

19. The ATM of claim 17, wherein each of the first ATM touch screen and the second ATM touch screen comprises an array of organic light emitting diodes (OLEDs) forming one or more pixels.

20. The ATM of claim 17, wherein at least one of the first ATM touch screen and the second ATM touch screen comprises an array of organic light emitting diodes (OLEDs) forming one or more pixels.

21. The ATM of claim 17, wherein the first ATM touch screen is positioned above the second ATM touch screen.

22. The ATM of claim 17, wherein the first ATM touch screen is positioned alongside the second ATM touch screen.

23. An automated teller machine (ATM) comprising multiple user screens, the ATM comprising:

an ATM information input device configured to receive user inputted information;

an ATM processor configured to determine if a data structure associated with the user inputted information corresponds to a valid data structure and to a particular touch screen, the determination being based entirely on user identification information;

an ATM receiver configured to receive the user identification information;

a first customer-facing ATM touch screen and a second customer-facing ATM touch screen;

a sensor device configured to detect the position of a user's eyes relative to the first and second customer-facing ATM touch screens, this position defines transmitted information, the sensor device is further configured to send the transmitted information to the ATM processor;

the ATM processor is further configured to calculate an ideal angle and to determine which of the first and second customer-facing ATM touch screens is within the ideal angle, the ideal angle is defined as the angle at which a display screen, positioned relative to the location of a user's eyes, affords the user the minimum glare;

the first customer facing ATM touch screen is configured to automatically display, in the event that the ATM processor determines that either the first customer-facing ATM touch screen is within the ideal angle or if neither the first nor second customer-facing ATM touch screen are within the ideal angle, if the data structure associated with the inputted information corresponds to a valid data structure and to the first, customer-facing, ATM particular touch screen, an initial ATM display;

only a single ATM dispenser configured to dispense the cash withdrawal amount in the event that an ATM central processing unit (CPU) receives information relating to a selection of a cash withdrawal amount; and the second customer facing ATM touch screen is configured to automatically display the initial ATM display, in the event that the ATM processor determines that either the second customer-facing ATM touch screen is within the ideal angle or if neither the first nor second customer-facing ATM touch screen are within the ideal angle, if the data structure corresponds to the second, customer-facing, ATM touch screen;

wherein the ATM information input device, the ATM receiver and the ATM dispenser are located between the first customer-facing ATM touch screen and the second, customer-facing, ATM touch screen.

* * * * *